US012373961B2

(12) United States Patent
Reaungamornrat et al.

(10) Patent No.: US 12,373,961 B2
(45) Date of Patent: Jul. 29, 2025

(54) AUTOMATIC MR-US PROSTATE IMAGE FUSION THROUGH SEMI-SUPERVISED CONSTRAINED LEARNING

(71) Applicant: SIEMENS HEALTHINEERS AG, Forchheim (DE)

(72) Inventors: Sureerat Reaungamornrat, Havertown, PA (US); Mamadou Diallo, Plainsboro, NJ (US); Ali Kamen, Skillman, NJ (US)

(73) Assignee: Siemens Healthineers AG, Forchheim (DE)

( * ) Notice: Subject to any disclaimer, the term of this patent is extended or adjusted under 35 U.S.C. 154(b) by 405 days.

(21) Appl. No.: 17/654,323

(22) Filed: Mar. 10, 2022

(65) Prior Publication Data

US 2023/0289984 A1 Sep. 14, 2023

(51) Int. Cl.
*G06T 7/33* (2017.01)
*G06T 7/11* (2017.01)

(52) U.S. Cl.
CPC .............. *G06T 7/33* (2017.01); *G06T 7/11* (2017.01); *G06T 2207/10028* (2013.01); *G06T 2207/10088* (2013.01); *G06T 2207/10132* (2013.01); *G06T 2207/20081* (2013.01); *G06T 2207/20084* (2013.01); *G06T 2207/30081* (2013.01)

(58) Field of Classification Search
CPC ... G06T 7/33; G06T 7/11; G06T 2207/10028; G06T 2207/10088; G06T 2207/10132; G06T 2207/20081; G06T 2207/20084; G06T 2207/30081
See application file for complete search history.

(56) References Cited

U.S. PATENT DOCUMENTS

2007/0103460 A1*  5/2007  Zhang ................ G06T 7/285
                                                          345/419
2013/0108127 A1*  5/2013  Boettger ............. G16H 50/50
                                                          600/300

FOREIGN PATENT DOCUMENTS

CN  112802073 A  *  5/2021  ............... G06T 7/11
CN  109949349 B  *  9/2021
WO  WO-2022257345 A1 * 12/2022  ............... G06N 3/04

OTHER PUBLICATIONS

Minghan Zhu, Correspondence-Free Point Cloud Registration with SO(3)-Equivariant Implicit Shape Representations, 5th Conference on Robot Learning (CoRL 2021), London, UK (Year: 2021).*

(Continued)

*Primary Examiner* — Vu Le
*Assistant Examiner* — Lei Zhao

(57) ABSTRACT

Systems and methods for automatically registering a first input medical image and a second input medical image are provided. The first input medical image in a first modality and the second input medical image in a second modality are received. One or more objects of interest are segmented from the first input medical image to generate a first segmentation map and one or more objects of interest are segmented from the second input medical image to generate a second segmentation map. A first point cloud is extracted from the first segmentation map and a second point cloud is extracted from the second segmentation map. A transformation for aligning the first point cloud and the second point cloud is determined to register the first input medical image and the second input medical image. The transformation is output.

15 Claims, 7 Drawing Sheets

(56) References Cited

OTHER PUBLICATIONS

Cornud et al., "TRUS-MRI image registration: a paradigm shift in the diagnosis of significant prostate cancer," 2013, Abdom Imaging No. 38, pp. 1447-1463.
Kongnyuy et al., "Magnetic Resonance Imaging-Ultrasound Fusion-Guided Prostate Biopsy: Review of Technology, Techniques, and Outcomes," 2016, Current Urology Reports No. 17, Article No. 32, 9 pgs.
Ward, "MRI-US Image Fusion Prostate Biopsy," 2019, Accessed Feb. 2022, https://grandroundsinurology.com/mri-us-Image-fusion-prostate-biopsy/, 4 pgs.
Marks, "MRI/US Fusion Biopsy," 2019, Accessed Feb. 2022. https://grandroundsinurology.com/mri-us-fusion-biopsy/, 6 pgs.
Sountoulides et al., "Micro-Ultrasound-Guided vs Multiparametric Magnetic Resonance Imaging-Targeted Biopsy in the Detection of Prostate Cancer: A Systematic Review and Meta-Analysis," 2021, The Journal of Urology vol. 205, pp. 1254-1262.
Klotz, "Can high resolution micro-ultrasound replace MRI in the diagnosis of prostate cancer?," 2020, European Urology Focus vol. 6, Issue 2, 15,pp. 419-423.
Iommi, "3D ultrasound guided navigation system with hybrid image fusion," 2021, Scientific Reports vol. 11, Article No. 8838, 10 pgs.
Fu et al., "Biomechanically constrained non-rigid MR-TRUS prostate registration using deep learning based 3D point cloud matching," 2021, Medical Image Analysis vol. 67, 30 pgs.
Sokolakis et al., "Usability and diagnostic accuracy of different MRI/ultrasound-guided fusion biopsy systems for the detection of clinically significant and insignificant prostate cancer: a prospective cohort study," 2021, World Journal of Urology vol. 39, pp. 4101-4108.
Liang et al., "PolyTransform: Deep Polygon Transformer for Instance Segmentation," 2020, Proceedings of the IEEE/CVF Conference on Computer Vision and Pattern Recognition (CVPR), pp. 9131-9140.
Li et al., "H-DenseUNet: Hybrid Densely Connected UNet for Liver and Tumor Segmentation From CT Volumes," 2018, IEEE Transactions on Medical Imaging, vol. 37, Issue: 12, pp. 2663-2674.
Abdollahi et al., "VNet: An End-to-End Fully Convolutional Neural Network for Road Extraction From High-Resolution Remote Sensing Data," 2020; IEEE Access. Vol. 8, pp. 179424-179436.
Caron et al., "Emerging Properties in Self-Supervised Vision Transformers," 2021, Proceedings of the IEEE/CVF International Conference on Computer Vision (ICCV), pp. 9650-9660.
El-Nouby et al., "XCIT: Cross-Covariance Image Transformers," 2021,35th Conference on Neural Information Processing Systems, 14 pgs.
Zbontar et al., "Barlow Twins: Self-Supervised Learning via Redundancy Reduction," 2021, Proceedings of the 38th International Conference on Machine Learning, PMLR 139, pp. 12310-12320.
Zbontar et al., Supplementary PDF—"Barlow Twins: Self-Supervised Learning via Redundancy Reduction," 2021, Proceedings of the 38th International Conference on Machine Learning, PMLR 139, 2 pgs.
He et al., "Momentum Contrast for Unsupervised Visual Representation Learning," 2020, Proceedings of the IEEE/CVF Conference on Computer Vision and Pattern Recognition (CVPR), pp. 9729-9738.
Park et al., "Contrastive Learning for Unpaired Image-to-Image Translation," 2020, Computer Vision—ECCV 2020, Lecture Notes in Computer Science, vol. 12354, pp. 319-345.
In et al., "Focal Loss for Dense Object Detection," 2017, Proceedings of the IEEE International Conference on Computer Vision (ICCV), pp. 2980-2988.
Perez, "FILM: Visual Reasoning with a General Conditioning Layer," 2018, Proceedings of the AAAI Conference on Artificial Intelligence, vol. 32, No. 1, pp. 3942-3951.
Zhu et al., "SEAN: Image Synthesis With Semantic Region-Adaptive Normalization," 2020, Proceedings of the IEEE/CVF Conference on Computer Vision and Pattern Recognition (CVPR), pp. 5104-5113.
Myronenko et al., "Point Set Registration: Coherent Point Drift," 2010, IEEE Transactions on Pattern Analysis and Machine Intelligence, vol. 32, No. 12, pp. 2262-2275.
Reaungamornrat et al., "Constrained Multiscale Registration of Non-Correspondent Incomplete Multi-Labeled Point Sets," 2021, Prior Art Journal 2021 No. 21, 7 pgs.
Reaungamornrat et al., "Multi-Scale Frequency-Disentanglement Network for Smooth Shape-Constrained Multi-Organ Segmentation," 2021, Prior Art Journal 2021 No. 15, 4 pgs.
Schroeder et al., "Flying edges: A high-performance scalable isocontouring algorithm," 2015, IEEE 5th Symposium on Large Data Analysis and Visualization, pp. 33-40.
Qi et al., "PointNet++: Deep Hierarchical Feature Learning on Point Sets in a Metric Space," 2017, Advances in Neural Information Processing Systems 30 (NIPS 2017), 10 pgs.
Guo et al., "PCT: Point cloud transformer," 2021, Computational Visual Media, vol. 7, No. 2, pp. 187-199.
Zhao et al., "Point Transformer," 2021, Proceedings of the IEEE/CVF International Conference on Computer Vision (ICCV), pp. 16259-16268.
Xiang et al., "SnowflakeNet: Point Cloud Completion by Snowflake Point Deconvolution With Skip-Transformer," 2021, Proceedings of the IEEE/CVF International Conference on Computer Vision (ICCV), pp. 5499-5509.
Yu et al., "PoinTr: Diverse Point Cloud Completion With Geometry-Aware Transformers," 2021, Proceedings of the IEEE/CVF International Conference on Computer Vision (ICCV), pp. 12498-12507.
Seferbekov et al., "Feature Pyramid Network for Multi-Class Land Segmentation," 2018, Proceedings of the IEEE Conference on Computer Vision and Pattern Recognition (CVPR) Workshops, pp. 272-275.
Zhao et al., "M2Det: A Single-Shot Object Detector Based on Multi-Level Feature Pyramid Network," 2019, Proceedings of the AAAI Conference on Artificial Intelligence, 33(01), pp. 9259-9266.
Christ et al., "Automatic Liver and Lesion Segmentation in CT Using Cascaded Fully Convolutional Neural Networks and 3D Conditional Random Fields," 2016, Medical Image Computing and Computer-Assisted Intervention, pp. 415-423.
Zhang et al., "A Sparse-View CT Reconstruction Method Based on Combination of DenseNet and Deconvolution," 2018, IEEE Transactions on Medical Imaging, vol. 37, No. 6, pp. 1407-1417.
Guo et al., "Underwater Image Enhancement Using a Multiscale Dense Generative Adversarial Network," 2020, IEEE Journal of Oceanic Engineering, vol. 45, No. 3, pp. 862-870.

* cited by examiner

Receive a first input medical image in a first modality and a second input medical image in a second modality
102

Segment one or more objects of interest from the first input medical image to generate a first segmentation map
104

Segment one or more objects of interest from the second input medical image to generate a second segmentation map
106

Extract a first point cloud from the first segmentation map
108

Extract a second point cloud from the second segmentation map
110

Determine a transformation for aligning the first point cloud and the second point cloud to register the first input medical image and the second input medical image
112

Output the transformation
114

AUTOMATIC MR-US PROSTATE IMAGE FUSION THROUGH SEMI-SUPERVISED CONSTRAINED LEARNING

TECHNICAL FIELD

The present invention relates generally to automatic MR (magnetic resonance)—US (ultrasound) prostate image fusion, and in particular to automatic MR-US prostate image fusion through semi-supervised constrained learning.

BACKGROUND mpMRI (multi-parametric magnetic resonance imaging) imaging enables noninvasive diagnosis of prostate cancer. Recently, mpMRI imaging has been increasingly adopted to guide prostate biopsy via MR (magnetic resonance) and US (ultrasound) fusion. However, automatic fusion of MR and US imaging is challenging due to the difficulty associated with multi-modality fusion, the low signal-to-noise ratio of US imaging, different fields of view, large deformations induced by instruments and organ motion, inhomogeneous image resolution, and the lack of meaningful and prominent features.

Conventionally, MR-US guided prostate biopsies rely on rigid registration based on manually-defined fiducials. However, as prostate MR imaging is difficult to interpret, even for experienced radiologists, a learning curve is required to recognize corresponding structures in MR and US imaging to achieve reliable rigid alignment.

BRIEF SUMMARY OF THE INVENTION

In accordance with one or more embodiments, systems and methods for automatically registering a first input medical image and a second input medical image are provided. The first input medical image in a first modality and the second input medical image in a second modality are received. One or more objects of interest are segmented from the first input medical image to generate a first segmentation map and one or more objects of interest are segmented from the second input medical image to generate a second segmentation map. A first point cloud is extracted from the first segmentation map and a second point cloud is extracted from the second segmentation map. A transformation for aligning the first point cloud and the second point cloud is determined to register the first input medical image and the second input medical image. The transformation is output.

In one embodiment, the transformation for aligning the first point cloud and the second point cloud is determined based on a density of points in the first point cloud and the second point cloud. The transformation may comprise a forward transformation to align the first point cloud to the second point cloud and a backward transformation to align the second point cloud to the first point cloud. The transformation is not determined based on a correspondence between points in the first point cloud and the second point cloud. The transformation for aligning the first point cloud and the second point cloud may be determined using a machine learning based point registration network. The first point cloud and the second point cloud may have a different number of points.

In one embodiment, the first modality is ultrasound and the second modality is magnetic resonance. The one or more objects of interest segmented from the first input medical image and the one or more objects of interest segmented from the second input medical image may comprise a prostate of a patient.

These and other advantages of the invention will be apparent to those of ordinary skill in the art by reference to the following detailed description and the accompanying drawings.

BRIEF DESCRIPTION OF THE DRAWINGS

FIG. 1 shows a method for registering a first input medical image and a second input medical image, in accordance with one or more embodiments;

DETAILED DESCRIPTION

The present invention generally relates to methods and systems for automatic MR (magnetic resonance)— US (ultrasound) prostate image fusion through semi-supervised constrained learning. Embodiments of the present invention are described herein to give a visual understanding of such methods and systems. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments described herein reduce the learning curve associated with conventional MR-US fusion-based biopsy systems by providing a deep learning based approach for real-time automatic fusion of preoperative 3D MR and intraoperative free-hand 2D US images. Specifically, embodiments described herein reduce the learning curve associated with the interpretation of prostate MR images to identifying corresponding structures in US images, the learning curve associated with the hardware involved in free-hand 2D US images, and the learning curve associated with fusion software as registration is performed automatically.

Figure 2:
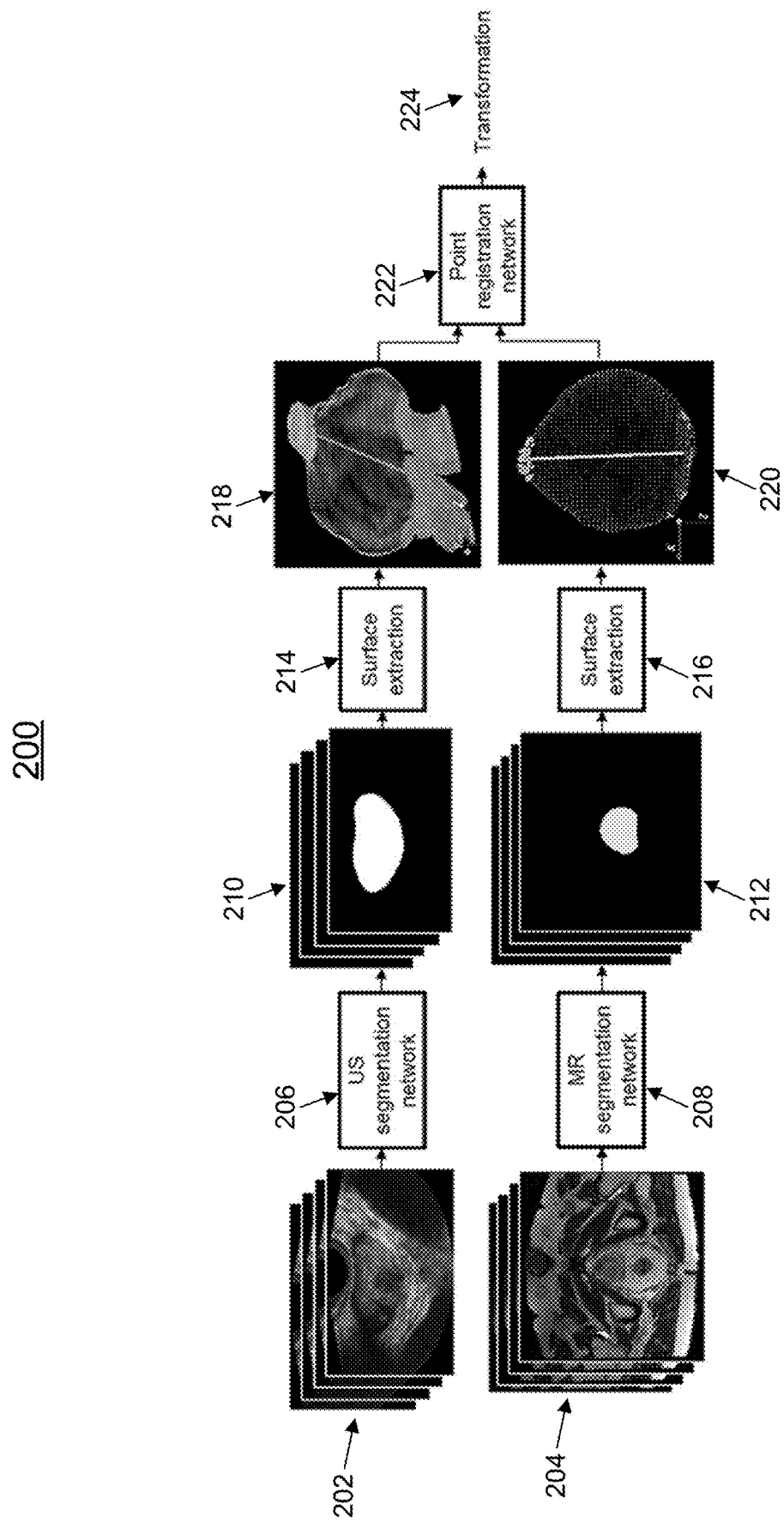
FIG. 2 shows a workflow for registering a first input medical image and a second input medical image, in accordance with one or more embodiments.

FIG. 1 shows a method 100 for registering a first input medical image and a second input medical image, in accordance with one or more embodiments. The steps of method 100 may be performed by one or more suitable computing devices, such as, e.g., computer 702 of FIG. 7. FIG. 2 shows a workflow 200 for registering a first input medical image and a second input medical image, in accordance with one or more embodiments. FIG. 1 and FIG. 2 will be described together.

At step 102 of FIG. 1, a first input medical image in a first modality and a second input medical image in a second modality are received. In one embodiment, the first and second input medical images depict a prostate of a patient. However, the first and second input medical images may depict any anatomical object of interest (e.g., organs, bones, lesions, nodules, etc.) of the patient.

In one embodiment, the first input medical image is an intraoperative US image and the second input medical image is a preoperative MR image. For example, as shown in FIG. 2, the first input medical image may be US image 202 and the second input medical image may be MR image 204 in workflow 200. However, the first modality of the first input medical image and/or the second modality of the second input medical image may comprise any other suitable imaging modality, such as, e.g., CT (computed tomography), x-ray, or any other medical imaging modality or combinations of medical imaging modalities. The first input medical image and/or the second input medical image may be 2D (two dimensional) images and/or 3D (three dimensional) volumes. Accordingly, reference herein to a pixel of an image may equally refer to a voxel of a volume (and vice versa). The first input medical image and/or the second input medical image may each comprise a single input medical image or a plurality of input medical images.

The first input medical image and/or the second input medical image may be received directly from an image acquisition device, such as, e.g., an MR scanner or US scanner, as the medical images are acquired, or can be received by loading previously acquired medical images from a storage or memory of a computer system or receiving medical images that have been transmitted from a remote computer system.

At step 104 of FIG. 1, one or more objects of interest are segmented from the first input medical image to generate a first segmentation map and, at step 106 of FIG. 1, one or more objects of interest are segmented from the second input medical image to generate a second segmentation map. In one embodiment, the one or more objects of interest segmented from the first input medical image and/or the second input medical image comprise the prostate and anatomical objects surrounding the prostate, such as, e.g., the apex and base of the prostate, the bladder neck, the urethra, the posterior capsule of the prostate, etc. The one or more objects of interest segmented from the first input medical image and/or the second input medical image comprise at least one of the same objects of interest.

The first and second segmentation maps may be represented as pixelwise (or voxelwise) probability maps having pixels respectively corresponding to pixels of the first input medical image and the second input medical image. Each respective pixel of the probability maps has a pixel value ranging from, e.g., 0 to 1 representing a probability that the respective pixel depicts an object of interest. The first and second segmentation maps may be represented as pixelwise binary maps by applying a threshold (e.g., 0.5) to each pixel value in the probability maps. Each respective pixel of the binary maps has a value of, e.g., 1 indicating that the respective pixel depicts an object of interest or a value of, e.g., 0 indicating that the respective pixel does not depict an object of interest.

The one or more objects of interest may be segmented from the first input medical image and the second input medical image using any suitable approach. In one embodiment, the one or more objects of interest are segmented from the first input medical image using a first machine learning based segmentation network and the one or more objects are segmented from the second input medical image using a second machine learning based segmentation network. For example, as shown in FIG. 2, one or more objects of interests may be segmented from US image 202 using US segmentation network 206 to generate segmentation map 210 and one or more objects of interest may be segmented from MR image 204 using MR segmentation network 208 to generate segmentation map 212. The first and second machine learning based segmentation networks are trained for a respective modality. Segmentation networks 206 and 208 receive US image 202 and MR image 204 as input and generates segmentation maps 210 and 212 as output, respectively.

Figure 3:
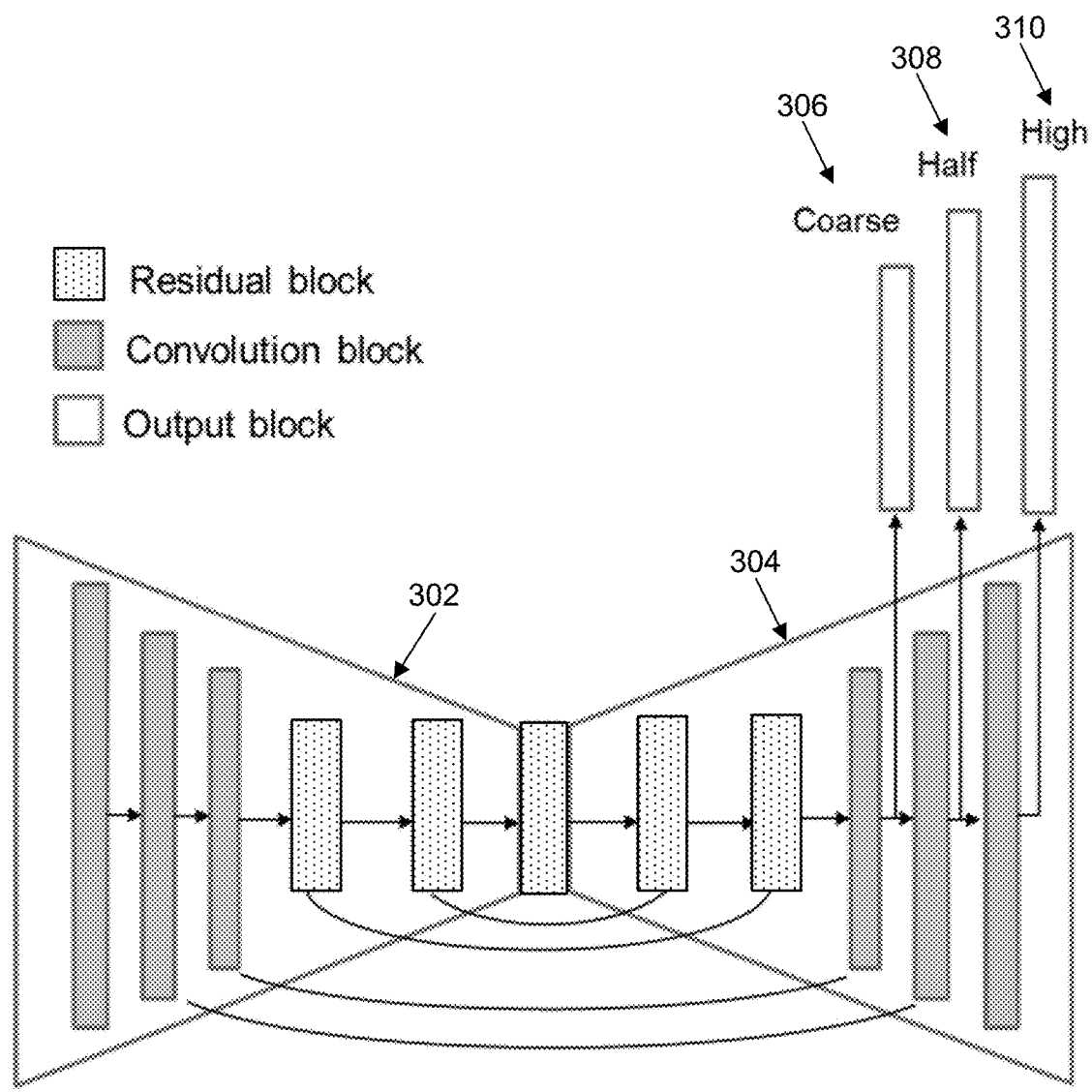
FIG. 3 shows an illustrative network architecture of a multiclass, multiscale segmentation network, in accordance with one or more embodiments.

In one embodiment, the first and/or the second segmentation networks may be implemented as shown and described with respect to FIG. 3. However, the first and/or the second segmentation networks may be implemented using transformers, a U-Net, a Dense U-NET, a V-Net, or any other suitable machine learning based architecture. The segmentation networks are trained to segment the objects of interest from the input medical images during a prior offline or training stage using ground truth annotated segmentation maps. Once trained, the trained segmentation networks are applied during an online or testing stage (e.g., at steps 104 and 106 of FIG. 1).

At step 108 of FIG. 1, a first point cloud is extracted from the first segmentation map and, at step 110 of FIG. 1, a second point cloud is extracted from the second segmentation map. For example, as shown in FIG. 2, surface extraction 214 is performed to extract point cloud 218 from segmentation mask 210 and surface extraction 216 is performed to extract point cloud 220 from segmentation mask 212 in workflow 200. The point clouds comprise a set of points representing the surface of the segmented objects of interest. The point clouds may be extracted from the segmentation maps using any suitable techniques. For example, Marching Cubes, Flying Edges, or any isocontouring algorithm can be used to generate contours or surfaces from 2D and 3D segmentation maps, respectively. Vertices of contours or surfaces represent point clouds. To improve computation efficiency, point clouds can be downsampled based on differential geometry information associated with each point (e.g., curvatures and normals), or using the farthest point sampling algorithm or point sampling networks.

At step 112 of FIG. 1, a transformation for aligning the first point cloud and the second point cloud is determined to register the first input medical image and the second input medical image. The transformation represents the registration between the first input medical image and the second input medical image. In one embodiment, the transformation comprises a forward transformation that aligns the first point cloud to the second point cloud and a backward transformation that aligns the second point cloud to the first point cloud.

The transformation for aligning the first point cloud and the second point cloud may be determined using any suitable approach. In one embodiment, the transformation is determined using a machine learning based point registration network. For example, as shown in FIG. 2, point registration network 222 determines a transformation 224 aligning point cloud 218 and point cloud 220. The point registration network determines the transformation based on a mass or density of points (e.g., as a Gaussian distribution) in the first point cloud and the second point cloud, not based on correspondences between points of the first point cloud and the second point cloud. Accordingly, the number of points in the first point cloud and the second point cloud may be different. The point registration network is trained to align the point clouds during a prior offline or training stage. Once trained, the trained point registration network is applied during an online or testing stage (e.g., at steps 112 of FIG. 1). In one embodiment, the point registration network may be implemented as shown and described with respect to FIG. 4. However, the point registration network may be implemented according to any other suitable machine learning based architecture.

At step 114 of FIG. 1, the transformation is output. For example, the transformation can be output by displaying the transformation on a display device of a computer system, storing the transformation on a memory or storage of a computer system, or by transmitting the transformation to a remote computer system.

FIG. 3 shows an illustrative network architecture of a multiclass, multiscale segmentation network 300, in accordance with one or more embodiments. Segmentation network 300 may be the segmentation networks used to respectively segment the one or more objects of interest from the first and second input medical image at steps 104 and 106 of FIG. 1 and/or may be US segmentation network 206 and/or MR segmentation network 208 in FIG. 2.

Segmentation network 300 comprises an encoder 302 and a decoder 304. As shown in FIG. 3, encoder 302 and decoder 304 are implemented with residual blocks, convolution blocks, and output blocks. Encoder 302 receives an input medical image as input and encodes the input medical image to low-level latent features. Decoder 304 decodes the latent features to generate as output coarse resolution segmentation mask 306, half resolution segmentation mask 308, and high-resolution segmentation mask 310 of one or more objects of interest depicted in the input medical image.

In one embodiment, transformer modules and their variants may be utilized as a bottleneck following encoder 302, as a block replacing any blocks in the encoders (e.g., residual blocks, convolution blocks, or output blocks), and/or to replace decoder 304 or any blocks in the decoder. Encoder 302 and the transformer encoder modules may be pretrained via self-supervised learning and/or contrastive learning. The pretraining allows segmentation network 300 to learn image features benefiting downstream tasks in an unsupervised manner, alleviating a requirement on large, annotated training data sets. Multiple data augmentation regimes could be used in self-supervised learning and/or contrastive learning, especially for segmentation downstream tasks. As segmentation networks should be invariant to image noise, image quality, and transformation, augmentation can include random spatial transformation of input images and approaches to degrade image quality, such as addition of image noise, image downsampling, partial image removal to mimic limited field of view or loss of imaging signal. Without self-supervision and contrastive learning, the latent features at the bottleneck capture shape and large-scale details of particular objects of interest. Self-supervision and contrastive learning, on the other hand, encourage encoders (regardless of network architectures, e.g., convolution networks, multilayer perceptrons, or transformers) to learn shape and large-scale details of all structures appearing in images. As bottleneck features tend to capture only large-scale structures, feature pyramid networks, skip connections, dense networks, or other multiscale schemes may be employed to transfer fine detailed information from encoders to decoders.

In one embodiment, segmentation network 300 may be trained using loss function $L_S$ of supervision signals comprising multiclass differential dice loss $L_d$, multilabel focal loss $L_f$, and/or cross entropy loss $L_C$. Loss function $\mathcal{L}$ is defined as follows:

$$\mathcal{L} = \sum_\ell \lambda_d L_d(\hat{S}_\ell, S_\ell) + \lambda_f L_f(\hat{S}_\ell, S_\ell) + \lambda_C L_C(\hat{S}_\ell, S_\ell) \quad \text{Equation (1)}$$

where $\lambda_i$ is a weighting factor for each i-th loss, $\ell$ is a resolution level, $\hat{S}_\ell = \{\hat{S}_\ell^k\}$ denotes a set of estimated binary segmentation of each k-th class, and $S_\ell = \{S_\ell^k\}$ represents a set of manual binary annotations of each class.

The dice loss for each level $\ell$ is defined as follows:

$$L_d(\hat{S}_\ell, S_\ell) = 1 - 2\mathbb{E}_k\left[\frac{\sum_{x \in \Omega}\left[\hat{S}_\ell^k(x) * S_\ell^k(x)\right] + \epsilon}{\sum_{x \in \Omega}\left[\hat{S}_\ell^k(x) + S_\ell^k(x)\right] + \epsilon}\right] \quad \text{Equation (2)}$$

where $\epsilon$ is a small constant added to prevent division by zero.

The focal loss is defined as follows:

$$L_f(\hat{S}_\ell, S_\ell) = \sum_k -\alpha_t^k\left(1 - S_\ell^k p_{S_\ell^k}\right)^\gamma S_\ell^k \log p_{S_\ell^k} \text{ for } p_{S_\ell^k} = \frac{\exp(\hat{S}_\ell^k)}{\sum_k \exp(\hat{S}_\ell^k)} \quad \text{Equation (3)}$$

and $\alpha_t^k = \alpha S_\ell^k + (1-\alpha)(1-S_\ell^k)$, where $\alpha$ is a weighting factor to balance positive and negative samples and $\gamma$ is a focusing parameter.

The cross entropy loss $L_C$ is defined as follows:

$$L_c(\hat{S}_\ell, S_\ell) = -\frac{1}{k}\sum_k S_\ell^k \log \frac{\exp(\hat{S}_\ell^k)}{\sum_k \exp(\hat{S}_\ell^k)} \quad \text{Equation (4)}$$

where $S_\ell^k = 1$.

The performance of segmentation network 300 was evaluated on unseen test US images of patients. The segmentation network achieved a dice score of 0.98.

Figure 4:
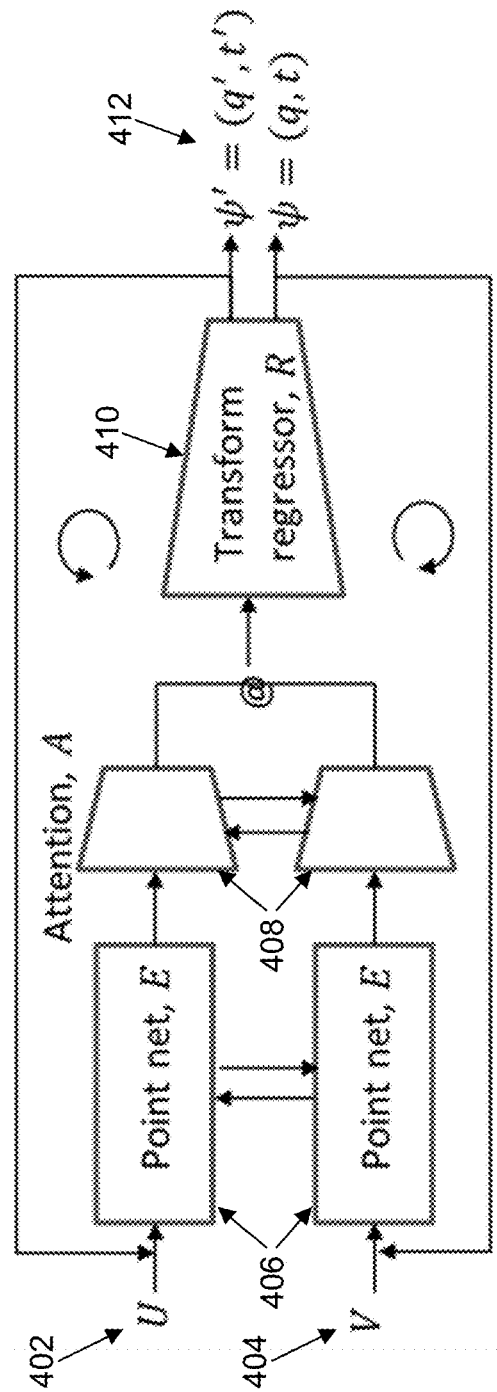
FIG. 4 shows an illustrative network architecture of a point registration network, in accordance with one or more embodiments.

FIG. 4 shows an illustrative network architecture of a point registration network 400, in accordance with one or more embodiments. Network architecture 400 may be the network architecture of the point registration network used to determine a transformation for aligning the first point cloud and the second point cloud at step 112 of FIG. 1 and/or the network architecture for implementing point registration network 222 of FIG. 2.

Point registration network 400 provides for an unsupervised multiscale and multi-labeled point set registration approach using a nonlinear embedding to make point registration network 400 invariant to varying number of points per inference, transformer-attention mechanisms to estimate permutation invariant features, and a multiscale distribution distance to improve the robustness to outliers, non-correspondence, and occlusion. Point features are extracted at different degrees of abstraction to allow the capturing of global and detailed structures. Similarities of global and detailed structures between two-point sets are also enforced through the minimization of the distribution distance at varying distribution scales. Since the optimization is based on a multiscale distribution distance, the approach is unsupervised and robust against outliers, non-correspondence, occlusion, and variations in number of points. This approach allows for the imposition of spatially varying constraints, such as invertibility (e.g., topology-preserving ability), rigidity, and smoothness.

As shown in FIG. 4, point registration network 400 comprises point embedding network E 406, attention module A 408, and transform regressor network R 410. The symbol $\mathbb{R}$ denotes a weight sharing between networks. While point embedding network E 406 and attention module A 408 are each separately shown to illustrate processing of point clouds U 402 and V 404, it should be understood that point embedding network E 406 is a single point embedding network and attention module A 408 is a single attention module for processing point clouds U 402 and V 404.

Point embedding network E 406 can be any suitable point feature extraction network, such as, e.g., PointNet, PointNet++, PointCNN (convolutional neural network), neighbor-aware PointNet, different architectures of Point transformers, or various other architectures based on MLP (multilayer perceptron), feed forward networks, 1D convolution networks, transformers, etc. Point embedding network E 406 receives point clouds U 402 and V 404 as input and generates embeddings as output. The embeddings are estimated as multiple abstractions at various scales. Consider an embedding $n_e$D for point embedding network E:

$$E: \mathbb{R}^{n_b \times d \times n} \to \mathbb{R}^{n_b \times n_e \times n}$$

for $n_b$ point sets in each batch and n number of dD points per point set.

The embeddings at each scale are respectively passed to attention module A 408 to generate multi-scale permutation invariant features. Attention module A 408 may be implemented using any suitable attention mechanism for estimating permutation invariant features, such as, e.g., max pooling, attention modules for multi-instance learning, slot attention modules, and various architectures of transformer attention modules. The attention function may be defined as:

$$A: \mathbb{R}^{n_b \times n_e \times n} \to \mathbb{R}^{n_b \times n \times 1}$$

that estimates permutation invariant features as:

$$f = E(P) \times A(E(P)) \in \mathbb{R}^{n_b \times n_e \times 1} \quad \text{Equation (5)}$$

where x denotes the batch matrix-matrix product (e.g., all n embeddings collapsed into one representative embedding or feature. Alternatively, the attention function may be defined as:

$$f = E(P) \odot A(E(P)) \in \mathbb{R}^{n_b \times n_e \times n} \quad \text{Equation (6)}$$

where $\odot$ denotes channel scaling or modulation in which, for each batch, each $n_e \times 1$ embedding is scaled by its corresponding attention weight and each batch comprises n embeddings each scaled/scored by attention weights.

To mitigate the dynamic range difference between the individual transformation elements (e.g., rotation, affine, translation, deformation) and for stable and fast training, point sets are normalized by a normalization matrix or any other normalization approaches. Let $$P = \{p_i\}_{i=1}^n$$

whose centroid is:

$$\bar{p} = \frac{1}{n} \sum_{i=1}^n p_i$$

Isotropic scaling can be computed as the maximum coordinate displacement between the centroid and the other points in the point set $\sigma_p = \max\{p_i^x - \bar{p}^x, p_i^y - \bar{p}^y, p_i^z - \bar{p}^z\}_{i=1}^n$, or computed to satisfy the assumption of Procrustes shape coordinates (invariant to Euclidean similarity transformations) as $\sigma_p = \sqrt{tr(PC(PC)^T)/n}$ for $C = (I - 11^T/n)$, where P is a d×n matrix of $p_i - \bar{p}$ for i=1, 2, ..., n, I is an n×n identity matrix, and 1 is an n×1 vector. The normalization matrix is of the form $$N_p = \frac{1}{\sigma_p}[I \; -\bar{p}] \in \mathbb{R}^{d \times d} \quad \text{Equation (7)}$$

Alternatively, anisotropic scaling based on standard deviations of coordinates can be used. The standard deviation for the j coordinate direction can be computed as $$\sigma_p^j = \frac{\sum_{i=1}^n p_i^j - \bar{p}^j}{(n-1)} \quad \text{Equation (8)}$$

and the same for the remaining coordinate directions. In this case the normalization is $$N_p = \begin{bmatrix} 1/\sigma_p^0 & 0 & 0 & 0 \\ 0 & 1/\sigma_p^1 & 0 & 0 \\ \vdots & \vdots & \ddots & \vdots \\ 0 & 0 & \cdots & 1/\sigma_p^d \end{bmatrix} - \bar{p} \in \mathbb{R}^{d \times d} \quad \text{Equation (9)}$$

The final transformation is the composition of the estimated transformation and normalization matrices. For example, if T is an estimated transformation that maps a normalized point set U to a normalized point set V, the final transformation is $N_V^{-1} \circ T \circ N_U$, where T can be any kind of transformation (e.g., rigid transformation, displacement fields, globally supported RBF (radial basis functions) (e.g., thin plate spline (TPS), multiquadric), or compactly supported RBF (e.g., compact-support TPS, Wendland, Gneiting). Instead of global-support RBF (e.g., TPS, Gaussian, and (inverse) multiquadric functions), compact-support RBFs better approximate spatially-varying local deformation. This approach allows for the estimation of both globally and compactly supported RBFs and, for rigid transformation, estimates quaternion as it is the robust representation of rotation.

The estimated transformations 412 are generated by transform regressor network R 410 based on a concatenation of the permutation invariant features from attention module A 108. Transformations 412 comprise forward transformations $\psi$ from U 402 to V 404 and backward transformations $\psi'$ from V 404 to U 402. Aside from multi-scale hidden features, point set similarity can be estimated at different scales of mixture models of point sets (e.g., asymmetric Gaussian mixtures, Bayesian nonparametric, t-mixtures, student's t-mixtures). A Gaussian mixture, for example, is a linear combination of Gaussian densities:

$$\varphi(x|\Theta) = \sum_{i=1}^{n} w_i \varphi_i(x|\mu_i, \Sigma_i) \qquad \text{Equation (10)}$$

$\Theta$ is a set of mixture parameters, $w_i$ is a weight satisfying $\Sigma_{i=1}^{n} w_i = 1$, and the i-th Gaussian density is:

$$\varphi_i(x|\mu_i, \Sigma_i) = \frac{\exp\left(-\frac{1}{2}(x-\mu_i)^T \Sigma_i^{-1}(x-\mu_i)\right)}{\sqrt{(2\pi)^d \det(\Sigma_i)}} \qquad \text{Equation (11)}$$

An overparameterized Gaussian mixture with equally weighted isotropic Gaussian densities is a simple model that can be used to represent each normalized point set at varying scales $\sigma$ as follows:

$$\varphi(x|\Theta_U) = \frac{1}{n}\sum_{i=1}^{n}\varphi_i(x|u_i, \sigma^2 I) \qquad \text{Equation (12)}$$

where the point set $U=\{u_i \in \mathbb{R}^d\}$. An overparameterized Gaussian mixture of the point set V can be modelled in the same way. This approach allows registration of both labeled and unlabeled point sets. For labeled point sets (e.g., different labels represent different organs), all labeled points are registered simultaneously in a higher dimension where a label is an additional coordinate of each point. Thus, a transformation mapping 2D (or 3D) labeled points is estimated in 3D (or 4D).

Constraints based on surrounding structures of the prostate can be imposed as: 1) additional inputs to the point registration network 400, 2) conditions via conditional networks (e.g., a feature-wise linear modulation network or conditional normalization), and/or 3) penalty functions. Constraints based on image acquisition or acquisition geometry can be imposed in a similar manner. In cases where constraints are imposed as additional inputs to the network, a shared point embedding network or different point embedding networks per structure can be used.

Point registration network 400 is trained in an unsupervised manner via a multiscale distribution loss. Thus, point registration network 400 does not rely on point correspondences nor an equal number of points between point clouds 402 and 404, but is fully permutation invariant and robust against outliers as registration is performed based on density or mass instead of discrete points where each density can be weighted based on the probability that points are not outliers. Denoting a mixture parameter of a structure s in a set of moving point clouds as $\theta_M^s$ and a mixture parameter of a structure s in a set of fixed point clouds as $\theta_F^s$, the multiscale $L^2$ distance between mixtures p of moving and fixed point clouds is:

$$L_{\ell_2} = \sum_{l}\sum_{s} w_s \mathbb{E}\left[\int [\varphi(x|\theta_M^{s,l}(\psi)) - \varphi(x|\theta_F^{s,l})]^2 dx\right] \qquad \text{Equation (13)}$$

where $\psi$ is the estimated transformation, l denotes a mixture scale, and $w_s$ weights the contribution from each structure. For example, distances between noisy structures can be weighted down while structures extracted with high certainty can be weighted up.

Constraints based on image acquisition and/or acquisition geometry can also be imposed in the same manner if they are based on a set of points. Otherwise, specific and/or custom losses $L_p$ based on such priors can be constructed and integrated into the training objective function. Additionally, (spatially varying) transformation regularization R (e.g., smoothness of deformation, incompressibility, diffeomorphism, invertibility, and orthogonality, etc.) can be imposed. To improve convergence, if transformation is affine or diffeomorphic, bi-direction transformations (i.e., transformations from fixed to moving point clouds and vice versa) are estimated. The objective function therefore is as follows:

$$\mathcal{L} = \lambda_{l^2} L_{l^2} + \lambda_p L_p + \lambda_r R(\psi) \qquad \text{Equation (14)}$$

Embodiments described herein are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the providing system.

Furthermore, certain embodiments described herein are described with respect to methods and systems utilizing trained machine learning based networks (or models), as well as with respect to methods and systems for training machine learning based networks. Features, advantages or alternative embodiments herein can be assigned to the other claimed objects and vice versa. In other words, claims for methods and systems for training a machine learning based network can be improved with features described or claimed in context of the methods and systems for utilizing a trained machine learning based network, and vice versa.

In particular, the trained machine learning based networks applied in embodiments described herein can be adapted by the methods and systems for training the machine learning based networks. Furthermore, the input data of the trained machine learning based network can comprise advantageous features and embodiments of the training input data, and vice versa. Furthermore, the output data of the trained machine learning based network can comprise advantageous features and embodiments of the output training data, and vice versa.

In general, a trained machine learning based network mimics cognitive functions that humans associate with other human minds. In particular, by training based on training data, the trained machine learning based network is able to adapt to new circumstances and to detect and extrapolate patterns.

In general, parameters of a machine learning based network can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained machine learning based network can be adapted iteratively by several steps of training.

In particular, a trained machine learning based network can comprise a neural network, a support vector machine, a decision tree, and/or a Bayesian network, and/or the trained machine learning based network can be based on k-means clustering, Q-learning, genetic algorithms, and/or association rules. In particular, a neural network can be a deep neural network, a convolutional neural network, a convolutional deep neural network, or a transformer. Furthermore, a neural network can be an adversarial network, a deep adversarial network and/or a generative adversarial network.

Figure 5:
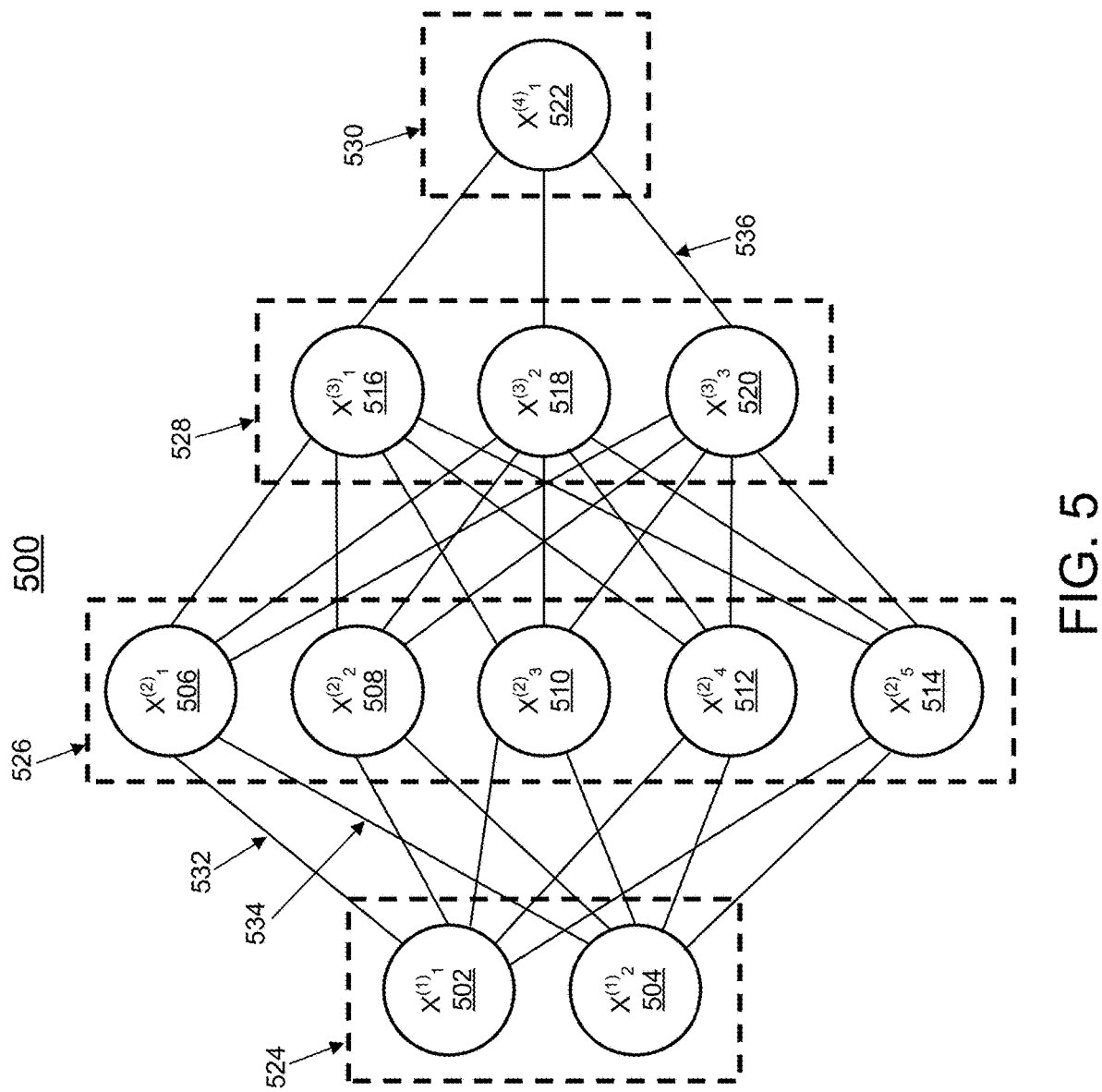
FIG. 5 shows an exemplary artificial neural network that may be used to implement one or more embodiments.

FIG. 5 shows an embodiment of an artificial neural network 500, in accordance with one or more embodiments. Alternative terms for "artificial neural network" are "neural network", "artificial neural net" or "neural net". Machine learning networks described herein, such as, e.g., the first segmentation network utilized at step 104, the second segmentation network utilized at step 106, and the point registration network utilized at step 112 of FIG. 1, US segmentation network 206, MR segmentation network 208, and point registration network 222 of FIG. 2, segmentation network 300 of FIG. 3, and point registration network 400 of FIG. 4, may be implemented using artificial neural network 500.

The artificial neural network 500 comprises nodes 502-522 and edges 532, 534, ..., 536, wherein each edge 532, 534, ..., 536 is a directed connection from a first node 502-522 to a second node 502-522. In general, the first node 502-522 and the second node 502-522 are different nodes 502-522, it is also possible that the first node 502-522 and the second node 502-522 are identical. For example, in FIG. 5, the edge 532 is a directed connection from the node 502 to the node 506, and the edge 534 is a directed connection from the node 504 to the node 506. An edge 532, 534, ..., 536 from a first node 502-522 to a second node 502-522 is also denoted as "ingoing edge" for the second node 502-522 and as "outgoing edge" for the first node 502-522.

In this embodiment, the nodes 502-522 of the artificial neural network 500 can be arranged in layers 524-530, wherein the layers can comprise an intrinsic order introduced by the edges 532, 534, ..., 536 between the nodes 502-522. In particular, edges 532, 534, ..., 536 can exist only between neighboring layers of nodes. In the embodiment shown in FIG. 5, there is an input layer 524 comprising only nodes 502 and 504 without an incoming edge, an output layer 530 comprising only node 522 without outgoing edges, and hidden layers 526, 528 in-between the input layer 524 and the output layer 530. In general, the number of hidden layers 526, 528 can be chosen arbitrarily. The number of nodes 502 and 504 within the input layer 524 usually relates to the number of input values of the neural network 500, and the number of nodes 522 within the output layer 530 usually relates to the number of output values of the neural network 500.

In particular, a (real) number can be assigned as a value to every node 502-522 of the neural network 500. Here, $x_i^{(n)}$ denotes the value of the i-th node 502-522 of the n-th layer 524-530. The values of the nodes 502, 504 of the input layer 524 are equivalent to the input values of the neural network 500, the value of the node 522 of the output layer 530 is equivalent to the output value of the neural network 500. Furthermore, each edge 532, 534, ..., 536 can comprise a weight being a real number, generally within the interval [−1, 1] or within the interval [0, 1]. Here, $w_{i,j}^{(m,n)}$ denotes the weight of the edge between the i-th node 502-522 of the m-th layer 524-530 and the j-th node 502-522 of the n-th layer 524-530. Furthermore, the abbreviation $w_{i,j}^{(n)}$ is defined for the weight $w_{i,j}^{(n,n+1)}$.

In particular, to calculate the output values of the neural network 500, the input values are propagated through the neural network. In particular, the values of the nodes 502-522 of the (n+1)-th layer 524-530 can be calculated based on the values of the nodes 502-522 of the n-th layer 524-530 by $$x_j^{(n+1)} = f(y_j^{(n)}), \qquad \text{Equation (15)}$$

$$\text{for } y_j^{(n)} = \sum_i x_i^{(n)} \cdot w_{i,j}^{(n)}.$$

Herein, the function f is a transfer function (another term is "activation function"). Known transfer functions are step functions, sigmoid function (e.g. the logistic function, the generalized logistic function, the hyperbolic tangent, the arctangent function, the error function, the smoothstep function) or rectifier functions. The transfer function is mainly used for normalization purposes in addition to nonlinearization.

In particular, the values are propagated layer-wise through the neural network, wherein values of the input layer 524 are given by the input of the neural network 500, wherein values of the first hidden layer 526 can be calculated based on the values of the input layer 524 of the neural network, wherein values of the second hidden layer 528 can be calculated based in the values of the first hidden layer 526, etc.

In order to set the values $w_{i,j}^{(n)}$ for the edges, the neural network 500 has to be trained using training data. In particular, training data comprises training input data and training output data (denoted as $t_i$). For a training step, the neural network 500 is applied to the training input data to generate calculated output data. In particular, the training data and the calculated output data comprise a number of values, said number being equal with the number of nodes of the output layer.

In particular, a comparison between the calculated output data and the training output data is used to recursively adapt the weights within the neural network 500 (backpropagation algorithm). In particular, the weights are changed according to $$w'_{i,j}{}^{(n)} = w_{i,j}{}^{(n)} - \gamma \cdot \delta_j^{(n)} \cdot x_i^{(n)} \qquad \text{Equation (16)}$$

wherein $\gamma$ is a learning rate, and the numbers $\delta^{(n)}_j$ can be recursively calculated as $$\delta_j^{(n)} = \left(\sum_k \delta_k^{(n+1)} \cdot w_{j,k}^{(n+1)}\right) \frac{\partial f}{\partial y_j^{(n)}} \qquad \text{Equation (17)}$$

based on $\delta_j^{(n+1)}$, if the (n+1)-th layer is not the output layer, and $$\delta_j^{(n)} = \frac{\partial \mathcal{L}}{\partial x_j^{(n+1)}} \frac{\partial f}{\partial y_j^{(n)}} \qquad \text{Equation (18)}$$

if the (n+1)-th layer is the output layer 530, wherein $L_S$ $(x_j^{(n+1)}, t_j^{(n+1)})$ is the objective function comparing the calculated output data $x_j^{(n+1)}$ and the training output data $t_j^{(n+1)}$ for the j-th node of the output layer 530. In the case where the objective function is the squared error $$\mathcal{L} = \frac{1}{2}(x_j^{(n+1)} - t_j^{(n+1)})^2,$$

the partial derivative of $L_S$ with respect to $x_j^{(n+1)}$ is $$\frac{\partial \mathcal{L}}{\partial x_j^{(n+1)}} = x_j^{(n+1)} - t_j^{(n+1)} \qquad \text{Equation (19)}$$

and $$\delta_j^{(n)} = \left(x_j^{(n+1)} - t_j^{(n+1)}\right)\frac{\partial f}{\partial y_j^{(n)}}.$$

Figure 6:
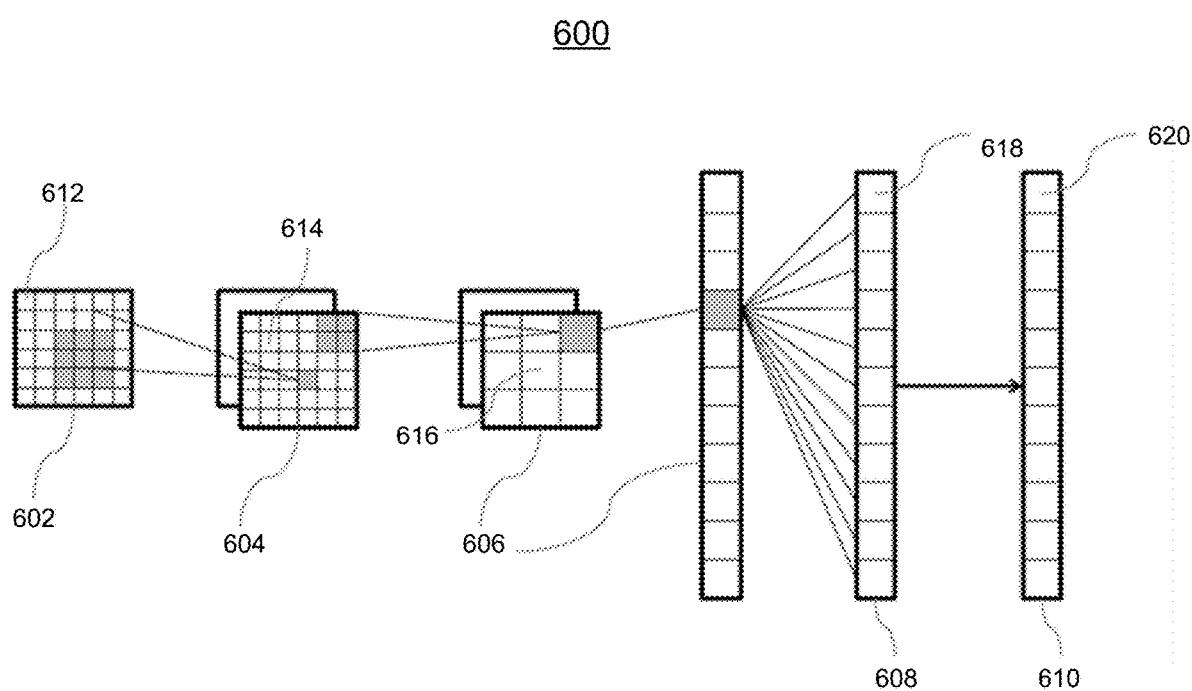
FIG. 6 shows a convolutional neural network that may be used to implement one or more embodiments.

FIG. 6 shows a convolutional neural network 600, in accordance with one or more embodiments. Machine learning networks described herein, e.g., the first segmentation network utilized at step 104, the second segmentation network utilized at step 106, and the point registration network utilized at step 112 of FIG. 1, US segmentation network 206, MR segmentation network 208, and point registration network 222 of FIG. 2, segmentation network 300 of FIG. 3, and point registration network 400 of FIG. 4, may be implemented using convolutional neural network 600.

In the embodiment shown in FIG. 6, the convolutional neural network 600 comprises an input layer 602, a convolutional layer 604, a pooling layer 606, a fully connected layer 608, and an output layer 610. Alternatively, the convolutional neural network 600 can comprise several convolutional layers 604, several pooling layers 606, and several fully connected layers 608, as well as other types of layers such as transformers and recurrent neural networks. The order of the layers can be chosen arbitrarily. The last layer before the output layer 610 is typically either fully connected layers 608 or convolutional layers 604.

In particular, within a convolutional neural network 600, the nodes 612-620 of one layer 602-610 can be considered to be arranged as a d-dimensional matrix or as a d-dimensional image. In particular, in the two-dimensional case the value of the node 612-620 indexed with i and j in the n-th layer 602-610 can be denoted as $x^{(n)}[i,j]$. The calculation of the convolutional neural network 600 is based on the structure and the weights of the edges as well as the arrangement of the nodes 612-620 due to the spatial inductive bias of a convolutional layer, i.e., nodes in the same spatial neighborhood are correlated.

In particular, a convolutional layer 604 is characterized by the structure and the weights of the incoming edges forming a convolution operation based on a certain number of kernels. In particular, the structure and the weights of the incoming edges are chosen such that the values $x_k^{(n)}$ of the nodes 614 of the convolutional layer 604 are calculated as a convolution $x_k^{(n)} = K_k * x^{(n-1)}$ based on the values $x^{(n-1)}$ of the nodes 612 of the preceding layer 602, where the convolution * is defined in the two-dimensional case as $$x_k^{(n)}[i,j] = \qquad\qquad \text{Equation (20)}$$
$$\left(K_k * x^{(n-1)}\right)[i,j] = \sum_{i'}\sum_{j'} K_k[i',j'] \cdot x^{(n-1)}[i-i', j-j'].$$

Here the k-th kernel $K_k$ is a d-dimensional matrix (a two-dimensional matrix in the above equation), which is usually small compared to the number of nodes 612 (e.g. a 3×3 matrix, or a 5×5 matrix). In particular, this implies that the weights of the incoming edges are not independent but chosen such that they produce said convolution equation. In particular, for a kernel being a 3×3 matrix, there are only 9 independent weights (each entry of the kernel matrix corresponding to one independent weight), irrespectively of the number of nodes 612-614 in the respective layer 602-604. In particular, for a convolutional layer 604, the number of nodes 614 in the convolutional layer is equivalent to the number of nodes 612 in the preceding layer 602 multiplied with the number of kernels.

If the nodes 612 of the preceding layer 602 are arranged as a d-dimensional matrix, using a plurality of kernels can be interpreted as adding a further dimension (denoted as "depth" dimension), so that the nodes 614 of the convolutional layer 604 are arranged as a (d+1)-dimensional matrix. If the nodes 612 of the preceding layer 602 are already arranged as a (d+1)-dimensional matrix comprising a depth dimension, using a plurality of kernels can be interpreted as modifying (e.g., expanding, contracting) along the depth dimension, so that the nodes 614 of the convolutional layer 604 are arranged also as a (d+1)-dimensional matrix, wherein the size of the (d+1)-dimensional matrix with respect to the depth dimension depends on number of kernels.

The advantage of using convolutional layers 604 is that spatially local correlation of the input data can be exploited by enforcing a local connectivity pattern between nodes of adjacent layers, in particular by each node being connected to only a small region of the nodes of the preceding layer.

In embodiment shown in FIG. 6, the input layer 602 comprises 36 nodes 612, arranged as a two-dimensional 6×6 matrix. The convolutional layer 604 comprises 72 nodes 614, arranged as two two-dimensional 6×6 matrices, each of the two matrices being the result of a convolution of the values of the input layer with a kernel. Equivalently, the nodes 614 of the convolutional layer 604 can be interpreted as arranged as a three-dimensional 6×6×2 matrix, wherein the last dimension is the depth dimension.

A pooling layer 606 can be characterized by the structure and the weights of the incoming edges and the activation function of its nodes 616 forming a pooling operation based on a non-linear pooling function f. For example, in the two dimensional case the values $x^{(n)}$ of the nodes 616 of the pooling layer 606 can be calculated based on the values $x_{(n-1)}$ of the nodes 614 of the preceding layer 604 as $$x^{(n)}[i,j]=f(\{x^{(n-1)}[s_i i+p, s_j j+q]|p=0,1,\ldots,N_p, q=0,1,\ldots,N_q\}) \qquad \text{Equation (21)}$$

where $s_i$ and $s_j$ are the step of a pooling stencil/kernel of size $N_p$ by $N_q$.

In other words, by using a pooling layer 606, the number of nodes 614, 616 can be reduced, by replacing $N_p$-by-$N_q$ neighboring nodes 614 in the preceding layer 604 with a single node 616 being calculated as a function of the values of said neighboring nodes in the pooling layer. In particular, the pooling function f can be a variant of max, average, or attention functions. In particular, for the basic max and average functions the weights of the incoming edges are fixed and are not modified by training.

The advantage of using a pooling layer 606 is that the number of nodes 614, 616 and the number of parameters is reduced. This minimizes the chance of overfitting and the amount of computation in the network.

In the embodiment shown in FIG. 6, the pooling layer 606 is a max-pooling, replacing four neighboring nodes with only one node, the value being the maximum of the values of the four neighboring nodes. The max-pooling is applied to each d-dimensional matrix of the previous layer; in this embodiment, the max-pooling is applied to each of the two two-dimensional matrices, reducing the number of nodes from 72 to 18.

A fully-connected layer 608 can be characterized by the fact that all edges between nodes 616 of the previous layer 606 and the nodes 618 of the fully-connected layer 608 are present, and wherein the weight of each of the edges can be adjusted individually.

In this embodiment, the nodes 616 of the preceding layer 606 of the fully-connected layer 608 are displayed both as two-dimensional matrices, and additionally as a line of nodes, wherein the number of nodes was reduced for a better presentability. In this embodiment, the number of nodes 618 in the fully connected layer 608 is equal to the number of nodes 616 in the preceding layer 606. Alternatively, the number of nodes 616, 618 can differ.

Furthermore, in this embodiment, the values of the nodes 620 of the output layer 610 are determined by applying the Softmax function onto the values of the nodes 618 of the preceding layer 608. By applying the Softmax function, the sum of the values of all nodes 620 of the output layer 610 is 1, and all values of all nodes 620 of the output layer are real numbers between 0 and 1.

A convolutional neural network 600 can also comprise activation layers with non-linear transfer functions such as ReLU (rectified linear units). In particular, the number of nodes and the structure of the nodes contained in a non-linear function layer is equivalent to the number of nodes and the structure of the nodes contained in the preceding layer. In particular, the value of each node in the non-linear function layer is calculated by applying a nonlinear function to the value of the corresponding node of the preceding layer.

A convolutional block can be used in place of a convolutional layer. Convolutional blocks can comprise convolutional layers, normalization layers, residual blocks, dense blocks (e.g., as used in a dense neural network), pooling functions, and nonlinear functions, for example. The input and output of different convolutional neural network blocks can be wired using summation (as used in residual/dense neural networks), element-wise multiplication (as used in attention and transformer modules) or other differentiable operators. Therefore, the convolutional neural network architecture can be nested rather than being sequential if the whole pipeline is differentiable.

In particular, convolutional neural networks 600 can be trained based on the backpropagation algorithm. To prevent overfitting, methods of regularization can be used, e.g. dropout of nodes 612-620, stochastic pooling, noise injection, use of artificial data, weight decay based on the L1 or the L2 norm, or max norm constraints. Different loss functions can be combined for training the same neural network to reflect the joint training objectives. A subset of the neural network parameters can be excluded from optimization to retain the weights pretrained on another datasets.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIG. 1 or 2. Certain steps or functions of the methods and workflows described herein, including one or more of the steps or functions of FIG. 1 or 2, may be performed by a server or by another processor in a network-based cloud-computing system. Certain steps or functions of the methods and workflows described herein, including one or more of the steps of FIG. 1 or 2, may be performed by a client computer in a network-based cloud computing system. The steps or functions of the methods and workflows described herein, including one or more of the steps of FIG. 1 or 2, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIG. 1 or 2, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 7:
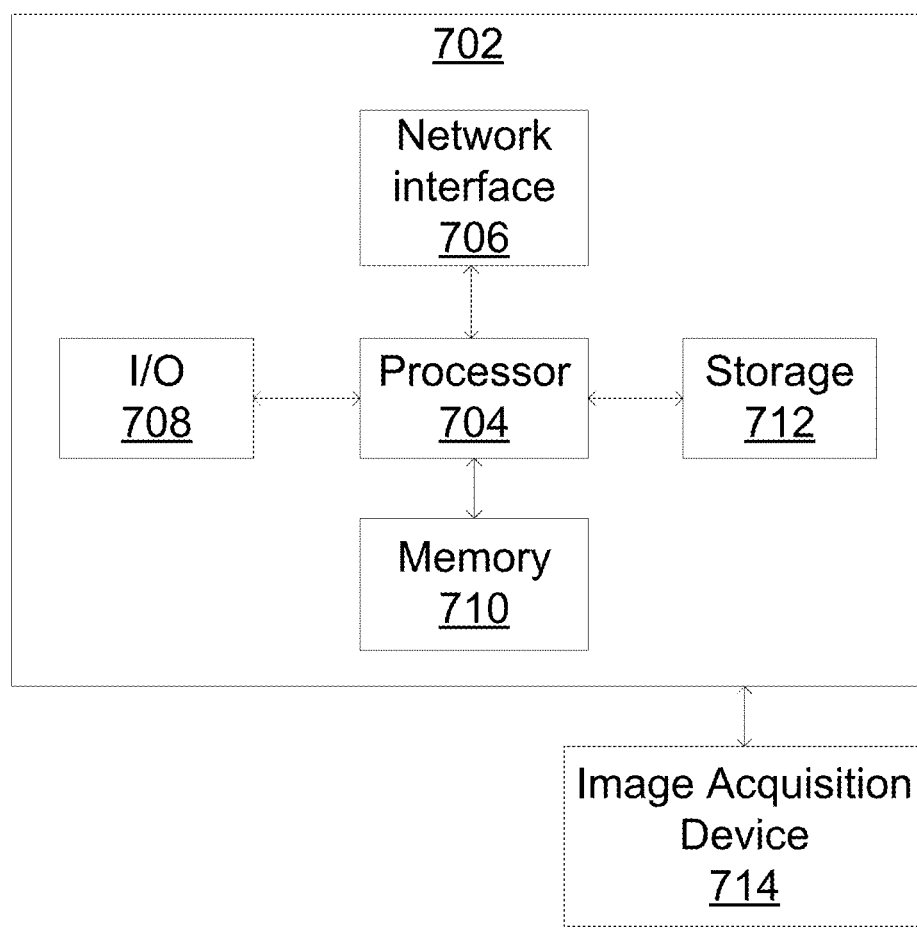
FIG. 7 shows a high-level block diagram of a computer that may be used to implement one or more embodiments.

A high-level block diagram of an example computer 702 that may be used to implement systems, apparatus, and methods described herein is depicted in FIG. 7. Computer 702 includes a processor 704 operatively coupled to a data storage device 712 and a memory 710. Processor 704 controls the overall operation of computer 702 by executing computer program instructions that define such operations. The computer program instructions may be stored in data storage device 712, or other computer readable medium, and loaded into memory 710 when execution of the computer program instructions is desired. Thus, the method and workflow steps or functions of FIG. 1 or 2 can be defined by the computer program instructions stored in memory 710 and/or data storage device 712 and controlled by processor 704 executing the computer program instructions. For example, the computer program instructions can be implemented as computer executable code programmed by one skilled in the art to perform the method and workflow steps or functions of FIG. 1 or 2. Accordingly, by executing the computer program instructions, the processor 704 executes the method and workflow steps or functions of FIG. 1 or 2. Computer 702 may also include one or more network interfaces 706 for communicating with other devices via a network. Computer 702 may also include one or more input/output devices 708 that enable user interaction with computer 702 (e.g., display, keyboard, mouse, speakers, buttons, etc.).

Processor 704 may include both general and special purpose microprocessors, and may be the sole processor or one of multiple processors of computer 702. Processor 704 may include one or more central processing units (CPUs), for example. Processor 704, data storage device 712, and/or memory 710 may include, be supplemented by, or incorporated in, one or more application-specific integrated circuits (ASICs) and/or one or more field programmable gate arrays (FPGAs).

Data storage device 712 and memory 710 each include a tangible non-transitory computer readable storage medium. Data storage device 712, and memory 710, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 708 may include peripherals, such as a printer, scanner, display screen, etc. For example, input/output devices 708 may include a display device such as a cathode ray tube (CRT) or liquid crystal display (LCD) monitor for displaying information to the user, a keyboard, and a pointing device such as a mouse or a trackball by which the user can provide input to computer 702.

An image acquisition device 714 can be connected to the computer 702 to input image data (e.g., medical images) to the computer 702. It is possible to implement the image acquisition device 714 and the computer 702 as one device. It is also possible that the image acquisition device 714 and the computer 702 communicate wirelessly through a network. In a possible embodiment, the computer 702 can be located remotely with respect to the image acquisition device 714.

Any or all of the systems and apparatus discussed herein may be implemented using one or more computers such as computer 702.

One skilled in the art will recognize that an implementation of an actual computer or computer system may have other structures and may contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer-implemented method comprising:
receiving a first input medical image in a first modality and a second input medical image in a second modality;
segmenting one or more objects of interest from the first input medical image to generate a first segmentation map;
segmenting one or more objects of interest from the second input medical image to generate a second segmentation map;
extracting a first point cloud from the first segmentation map;
extracting a second point cloud from the second segmentation map;
determining a transformation for aligning the first point cloud and the second point cloud using a machine learning based point registration network based on a density of points in the first point cloud and the second point cloud to register the first input medical image and the second input medical image, the machine learning based point registration network comprising 1) one or more point embedding networks for generating embeddings based on the first input medical image and the second input medical image, 2) one or more attention modules for generating permutation invariant features based on the embeddings, and 3) a transform regressor network for generating the transformation based on the permutation invariant features; and
outputting the transformation.

2. The computer-implemented method of claim 1, wherein determining a transformation for aligning the first point cloud and the second point cloud using a machine learning based point registration network based on a density of points in the first point cloud and the second point cloud to register the first input medical image and the second input medical image comprises:
determining a forward transformation to align the first point cloud to the second point cloud; and
determining a backward transformation to align the second point cloud to the first point cloud.

3. The computer-implemented method of claim 1, wherein the first point cloud and the second point cloud have a different number of points.

4. The computer-implemented method of claim 1, wherein the transformation is not determined based on a correspondence between points in the first point cloud and the second point cloud.

5. The computer-implemented method of claim 1, wherein the first modality is ultrasound and the second modality is magnetic resonance.

6. The computer-implemented method of claim 1, wherein the one or more objects of interest segmented from the first input medical image and the one or more objects of interest segmented from the second input medical image comprise a prostate of a patient.

7. An apparatus comprising:
means for receiving a first input medical image in a first modality and a second input medical image in a second modality;
means for segmenting one or more objects of interest from the first input medical image to generate a first segmentation map;

means for segmenting one or more objects of interest from the second input medical image to generate a second segmentation map;

means for extracting a first point cloud from the first segmentation map;

means for extracting a second point cloud from the second segmentation map;

means for determining a transformation for aligning the first point cloud and the second point cloud using a machine learning based point registration network based on a density of points in the first point cloud and the second point cloud to register the first input medical image and the second input medical image, the machine learning based point registration network comprising 1) one or more point embedding networks for generating embeddings based on the first input medical image and the second input medical image, 2) one or more attention modules for generating permutation invariant features based on the embeddings, and 3) a transform regressor network for generating the transformation based on the permutation invariant features; and means for outputting the transformation.

8. The apparatus of claim 7, wherein the means for determining a transformation for aligning the first point cloud and the second point cloud using a machine learning based point registration network based on a density of points in the first point cloud and the second point cloud to register the first input medical image and the second input medical image comprises:

means for determining a forward transformation to align the first point cloud to the second point cloud; and means for determining a backward transformation to align the second point cloud to the first point cloud.

9. The apparatus of claim 7, wherein the first point cloud and the second point cloud have a different number of points.

10. The apparatus of claim 7, wherein the transformation is not determined based on a correspondence between points in the first point cloud and the second point cloud.

11. A non-transitory computer readable medium storing computer program instructions, the computer program instructions when executed by a processor cause the processor to perform operations comprising:

receiving a first input medical image in a first modality and a second input medical image in a second modality;

segmenting one or more objects of interest from the first input medical image to generate a first segmentation map;

segmenting one or more objects of interest from the second input medical image to generate a second segmentation map;

extracting a first point cloud from the first segmentation map;

extracting a second point cloud from the second segmentation map;

determining a transformation for aligning the first point cloud and the second point cloud using a machine learning based point registration network based on a density of points in the first point cloud and the second point cloud to register the first input medical image and the second input medical image, the machine learning based point registration network comprising 1) one or more point embedding networks for generating embeddings based on the first input medical image and the second input medical image, 2) one or more attention modules for generating permutation invariant features based on the embeddings, and 3) a transform regressor network for generating the transformation based on the permutation invariant features; and outputting the transformation.

12. The non-transitory computer readable medium of claim 11, wherein determining a transformation for aligning the first point cloud and the second point cloud using a machine learning based point registration network based on a density of points in the first point cloud and the second point cloud to register the first input medical image and the second input medical image comprises:

determining a forward transformation to align the first point cloud to the second point cloud; and determining a backward transformation to align the second point cloud to the first point cloud.

13. The non-transitory computer readable medium of claim 11, wherein the first point cloud and the second point cloud have a different number of points.

14. The non-transitory computer readable medium of claim 11, wherein the first modality is ultrasound and the second modality is magnetic resonance.

15. The non-transitory computer readable medium of claim 11, wherein the one or more objects of interest segmented from the first input medical image and the one or more objects of interest segmented from the second input medical image comprise a prostate of a patient.

* * * * *